United States Patent

[11] 3,561,506

| [72] | Inventor | Allan B. Johnson<br>Tarzana, Calif. |
|---|---|---|
| [21] | Appl. No. | 751,496 |
| [22] | Filed | Aug. 9, 1968 |
| [45] | Patented | Feb. 9, 1971 |
| [73] | Assignee | Industrial Molding Corporation<br>Torrance, Calif.<br>a corporation of California |

[54] WATER PURIFIER
8 Claims, 5 Drawing Figs.

[52] U.S. Cl. .................................................. 141/360,
141/198
[51] Int. Cl. .................................................. B67d 5/00
[50] Field of Search........................................... 141/348,
349, 351, 358, 360, 362, 363, 364, 199, 200, 201,
202, 203, 204, 205, 229; 136/162.3, 162.5;
137/429, 430

[56] References Cited
UNITED STATES PATENTS
1,086,215  2/1914  Porter ........................... 137/430X

| 1,942,908 | 1/1934 | Swain et al..................... | 137/430X |
| 3,189,063 | 6/1965 | Lowe............................ | 141/199 |
| FOREIGN PATENTS | | | |
| 19,936 | 2/1915 | Denmark....................... | 141/199 |

Primary Examiner—Laverne D. Geiger
Assistant Examiner—Richard I. Sher
Attorney—Burns, Doane, Benedict, Swecker & Mathis ABSTRACT: A liquid dispensing unit which includes a housing having a reservoir for unfiltered water. A receptacle is releasably connected with the housing. Whenever the receptacle is connected with the housing, liquid is automatically caused to flow from the reservoir into the receptacle until a predetermined liquid level therein is exceeded at which time further liquid flow is automatically terminated. Means are also provided for automatically preventing liquid flow from the reservoir whenever the receptacle is not connected with the housing.

PATENTED FEB 9 1971
3,561,506
SHEET 1 OF 2
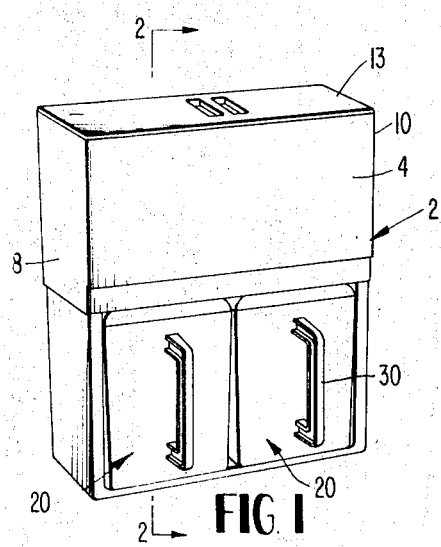
FIG. 1
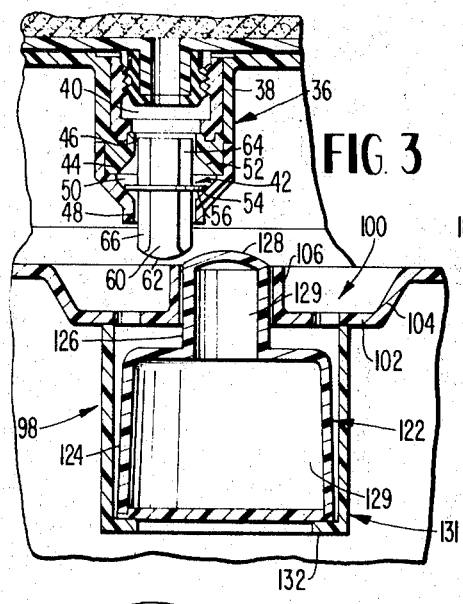
FIG. 3
FIG. 2
FIG. 4
INVENTOR
ALLAN B. JOHNSON
BY
Burns, Doane, Benedict, Swecker & Mathis
ATTORNEYS 3,561,506

WATER PURIFIER

BACKGROUND OF INVENTION

This invention relates to a liquid dispensing unit. In particular the invention relates to a liquid dispensing unit particularly suitable for use in conjunction with a water purifier for providing a supply of filtered drinking water for domestic, military, camping and other applications.

In providing drinking water for domestic purposes under circumstances where a main supply of adequately purified drinking water is not available, it may often be necessary to utilize some form of domestic water purifier unit. For example, it may be desired to provide a supply of drinking water where the only available water supply is a private well, a river or a lake. In order to render such water (often referred to as raw water) sufficiently pure for human consumption, it is usually necessary to perform a filtration step to remove many of the impurities from the water.

For this purpose various forms of domestic water purifier units have heretofore been devised. In their simplest forms such prior devices have sometimes comprised a reservoir for containing the raw water. An outlet from the reservoir is provided with a filter to collect impurities in water passing through the outlet. A suitable tap for controlling the flow of water to an underlying receptacle for the drinking water may be included.

Such a simple arrangement, however, suffers from the disadvantage that the unit requires constant supervision while filtering is in process, to ensure that the supply of filtered water is turned off once the receptacle is full to prevent unwanted overflowing of the receptacle. This need for supervision can be quite time-consuming, especially if the water drips relatively slowly through the filter as is often the case. In addition, it may be difficult to observe when to turn off the tap if an opaque receptacle is used.

It would therefore be desirable to provide a unit for providing drinking water in domestic, and like applications, which could provide a full but not overflowed receptacle of filtered drinking water without supervision. To do this the unit should be capable of terminating liquid outflow automatically whenever a receptacle still connected with the reservoir is filled. In addition to this, provision should also be made for automatic termination of flow of water whenever the receptacle is removed from the reservoir for use. Furthermore, the unit should be mechanically simple and adapted for low cost manufacture, in view of its probable use and purchase for domestic household purposes.

SUMMARY OF INVENTION

It is therefore a general object of the invention to provide a liquid dispensing unit which may function with a minimum of supervision.

It is a particular object of the invention to provide a liquid dispensing unit utilizing a receptacle releasably connected to a reservoir of liquid, wherein outflow of liquid from the reservoir is automatically terminated whenever the receptacle is removed from connection with the reservoir.

It is another object of the invention to provide a liquid dispensing unit including a receptacle releasably connected to a liquid reservoir wherein overfilling of the receptacle is automatically prevented to prevent overflow of water about the receptacle.

A liquid dispensing unit in accordance with a preferred embodiment of the invention includes a housing having a reservoir adapted to be filled with raw liquid. A receptacle adapted to contain liquid is releasably connected with the reservoir. An inlet unit is carried by and permanently connected with the receptacle and includes inlet passage means for conducting liquid into the receptacle. The inlet unit also includes sensor means for sensing the level of liquid within the receptacle. An outlet unit connected with the housing includes outlet passage means for conducting liquid from the reservoir to the inlet passage means whenever the receptacle is connected to the housing. Flow control means connected with the outlet passage means enters into operative association with the sensor means upon connection of the receptacle with the housing, to cause liquid to flow through the passage means when the liquid level in the receptacle is less than a predetermined value. The flow control means terminates the liquid flow when the predetermined liquid level in the receptacle is exceeded. Disconnection of the receptacle from the housing causes the flow control means to become disassociated from the sensor means. Such disassociation causes the flow control means to terminate liquid flow through the outlet passage means.

It will be seen that the arrangement described provides for termination of flow of liquid from the reservoir whenever the receptacle is removed from the housing. Also, and very significantly, liquid flow from the reservoir into the receptacle is terminated automatically whenever the liquid level in the receptacle reaches the predetermined value, in order to prevent overflowing of liquid onto or from the receptacle. Such overflowing might otherwise cause unwanted wetting of the exterior of the receptacle to the inconvenience of persons utilizing the receptacle, as well as creating an unsightly mess about the housing.

In more detail the sensor means comprises a simple buoyant float adapted to float upon the surface of the water in the receptacle. Upon connection of the receptacle to the housing, the float body enters into releasable engagement with an actuating member movably mounted on the housing for motion between predetermined extreme upper and lower positions. Vertical movement of the float body within the receptacle causes corresponding movement of the actuating member between the extreme upper and lower positions. The actuating member is operatively connected with a valve interposed in the outlet passage means and causes the valve to terminate liquid flow whenever the actuating member occupies either of its extreme positions. In any position intermediate the extremes however, the actuating member causes the valve means to permit liquid flow. The float body, the receptacle, the housing and the actuating member are so relatively disposed that whenever the liquid level in the receptacle attains or exceeds the predetermined value, the movable member is moved to its upper extreme position. This prevents further pouring of liquid into the receptacle likely to lead to overflowing.

Limiting means, however, are provided for limiting the lowest position of the float body within the receptacle to a level sufficient to ensure that the actuating member is always spaced at least a small distance about its lower extreme position whenever the receptacle is connected to the housing so that the valve remains open to permit liquid to flow into the receptacle to fill it. If, however, the receptacle is entirely removed from the housing, the actuating member is returned by gravity to its lower extreme position to cause the valve to prevent further outflow of the fluid from the reservoir.

THE DRAWINGS

A liquid dispensing unit constructed in accordance to a preferred embodiment of the invention is illustrated in the accompanying drawings in which:

FIG. 1 is a perspective view of a liquid dispensing unit according to one preferred embodiment of the invention;

FIG. 2 is a cross-sectional side view of the liquid filtering and dispensing unit shown in FIG. 1 taken along the lines 2–2 therein;

FIG. 3 is a cross-sectional side view on an enlarged scale of a flow control system forming a part of the liquid dispensing unit shown in FIG. 1, shown in a condition in which liquid outflow is prevented upon removal of a receptacle from the unit;

FIG. 4 is another view of the portion of the apparatus shown in FIG. 3 but with the receptacle fully housed and with the flow unit shown in a flow preventing condition after filling of the receptacle to a predetermined full level.

DETAILED DESCRIPTION

Figure 5:
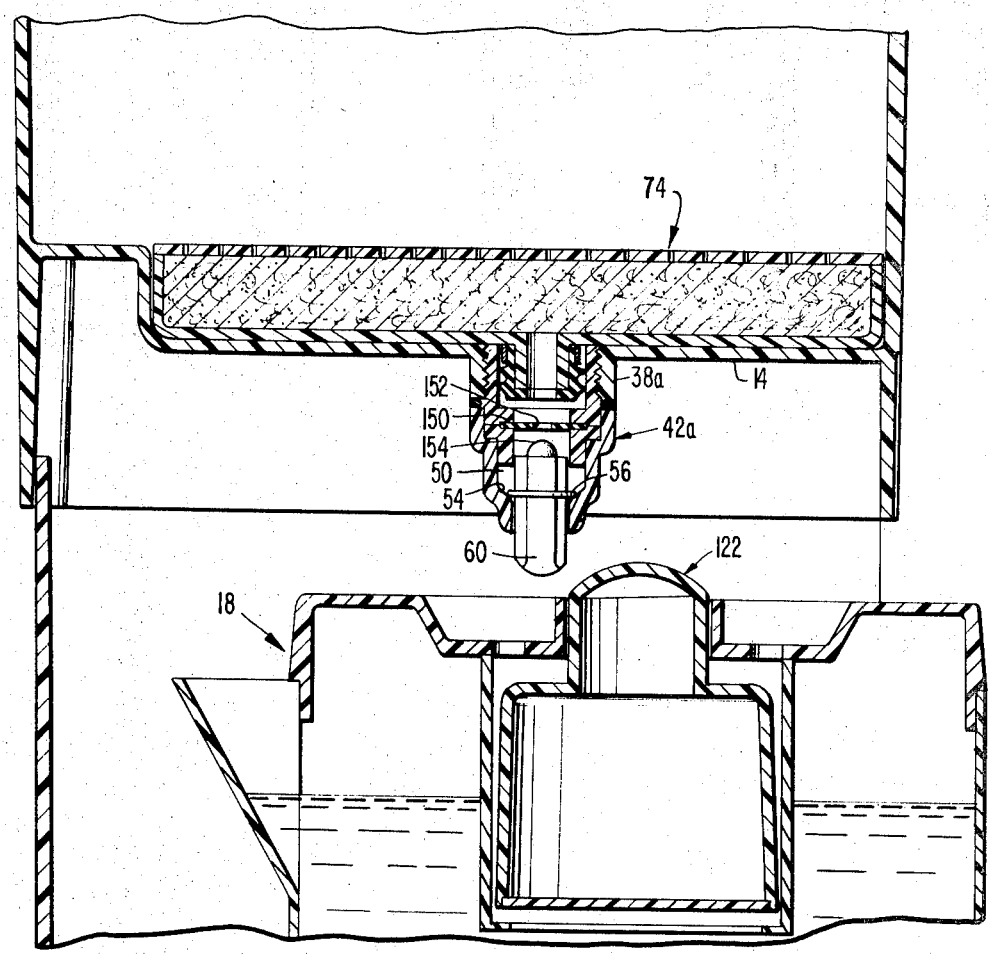
FIG. 5 is a cross-sectional, side view of a second embodiment of the flow control system according to the invention.

Referring to FIG. 1 of the drawings, a liquid dispensing unit constructed in accordance with a preferred embodiment of the invention, is there shown. The unit includes a generally rectangular, upright housing 2 having front and rear walls 4 and 6, respectively, and left and right side walls 8 and 10 respectively.

Within the housing 2 in the upper part thereof is a generally rectangular, vertically extending tank or reservoir 12 (FIG. 2) which is filled with raw water to be filtered. The bottom of the tank is defined by a generally horizontal bottom wall 14 extending transversely and longitudinally between the sidewall and the front and rear walls. A removable top lid 13 (suitably vented to atmosphere) may be lifted from the housing for providing access to the reservoir 12 to fill it with the raw water.

To provide access to the interior of the housing 2 below the reservoir 12, a vertically and transversely extending rectangular aperture 16 is provided in the front wall 4. The opening 16 provides access to an internal chamber 18 extending downwardly below the base wall 14 within the housing 2.

The purpose of the chamber 18 is to provide space within which two removable water receptacles 20 may be received beneath the reservoir for receiving filtered water therefrom in a manner later to be described.

Each of the water receptacles 20 comprises a rectangular, vertically and laterally extending enclosed hollow container including front and rear vertical walls 22 and 24, respectively, and upper and lower horizontal walls 26 and 28, respectively. The upper horizontal wall 26 takes the form of a removable cover for the pitcher. Each pitcher or water receptacle 20 further includes a vertically mounted carrying handle 30 projecting fixedly outwardly from the front face of the front wall 22. A spout 32 for pouring water from the receptacle is provided on the rear wall 23 of each receptacle adjacent the upper end thereof projecting rearwardly outwardly. The pitchers 20 are alike and when mounted in the housing are positioned symmetrically on opposite lateral sides of a longitudinal median plane of the housing 2. The front walls 22 of the pitchers may be transparent so that a user may see whether the pitchers are full.

Supporting the water receptacles 20 in the housing is an underlying, generally horizontal base member 35 formed integrally with the housing 2 at the lower end thereof. The base member 35 includes a transversely and upwardly extending shoulder 38 spaced from the rear wall 6 parallel thereto. The shoulder 38 abuttingly contacts the rear wall 24 of each of the receptacles 20 as each is slid into the housing to locate the receptacle in its fully housed position.

In the fully housed position, each receptacle 20 has its rear wall 24 spaced a sufficient distance from the rear wall 6 of the housing to ensure that the spout 32 does not contact the rear wall. Additionally, the forward wall 22 of each receptacle 20 is aligned in generally the same plane as the front wall 4 of the housing. The upper wall 26 or removable cover of each receptacle 20 in the housed position is spaced below the lower wall 14 of the reservoir 12.

To conduct liquid outwardly from the reservoir 12 for subsequent delivery to the receptacles 20, two outlet units 36 are provided. Each outlet unit 36 is positioned above one of the water receptacles 20, with the outlet unit extending downwardly from the undersurface of the lower wall 14 of the reservoir. In view of the fact that both outlet units 36 are identical, the construction of only one of of the outlet units will be described.

The outlet unit 36 includes a generally circular, tubular wall 38 (FIG. 3) formed integrally with the wall 14 depending downwardly therefrom. The wall 38 defines an interior outlet passage 40 which is open at its lower end and communicates at its upper end with the interior of the reservoir 12. The outlet passage 40 is formed generally symmetrically about a vertical axis $x-x$ (FIG. 1) which passes through a point positioned generally transversely and longitudinally centrally of the underlying upper wall 26 of the adjacent water receptacle 29 when the latter is in its fully housed position.

To control the flow of liquid through the outlet passage 40, a valve unit generally designated 42 (FIG. 3) is connected with the lower end of the wall 38. The valve unit 42 includes an annular construction portion 44 fixedly connected with the lower end of the wall 38. The constricted portion 44 includes axially extending, upper and lower circular bore portions 46 and 48 of equal diameter spaced axially from each other and concentric with the axis $x-x$. Intermediate the upper and lower bore portions 46 and 48 is an annular valve chamber 50 defined by an annular, upper valve seat 52 extending downwardly and radially outwardly from the upper bore portion 46 and by an annular lower valve seat 54 inclined upwardly and radially outwardly from the lower bore portion 48.

A horizontal, circular, disclike, valve member 56 is movable vertically between the upper and lower valve seats and prevents liquid flow through the valve unit 42 whenever the valve member is in abutting sealing contact with either the upper or the lower valve seats 52 and 54, respectively (FIGS. 3 and 4). When the valve member 56 is out of contact with either of the valve seats in an intermediate position within the valve chamber 50 (FIG. 2), however, liquid flows about the edge of the valve member 56 thus causing liquid to flow through the outlet unit 36.

Valving movement of the valve member 56 between the upper and lower valve seats is effected by an actuating member 60 (FIG. 2). The actuator member 60 comprises a cylindrical body fixedly and concentrically secured to the valve member 56 extending upwardly and downwardly therefrom. The upper and lower portions of the actuating member 60 are slidably mounted in the upper and lower bore portions 46 and 48 respectively. Thus the actuator member 60 carries the valve member 56 and locates it concentrically with respect to the upper and lower valve seats 52 and 54.

The lower end of the actuating member 60 projects downwardly and outwardly below the lowest extremity of the outlet unit 36 and is provided with a downwardly convex, curved surface 62. An upward pushing force applied to the lower surface 62 of the actuating member (as will be described) causes the actuating member 60 to move the valve member 56 upwardly until in an extreme upper position of the actuating member 60, the valve 56 is moved into seating contact with the upper valve seat 52. When the upward force is removed, the weight of the actuating member 60 is sufficient to cause the valve body 56 to be moved downwardly under gravity and the effect of hydrostatic pressure into sealing, seating contact against the lower valve seat 54 at which time the actuating member occupies an extreme lower position.

So that liquid may pass freely through the upper and lower bore portions 46 and 48 to and from the valve chamber 50, a plurality of upper and lower, axially extending grooved passages 64 and 66 respectively are provided in the peripheral surface of the actuating member 60.

It will be appreciated that the actuator 60 and valve unit 42 together constitute a flow controlling subassembly within the outlet unit 36 for controlling flow of liquid therethrough.

As the unit is to supply filtered drinking water, it is of course necessary to provide a filter between the raw water in the reservoir 12 and the exit of the outlet unit 36. For this purpose a depressed generally rectangular well 68 (FIG. 2)) intersected by the axis $x-x$, is formed integrally in the lower base wall 14 of the reservoir. The well 68 has a horizontal flat bottom wall 70, from which the previously mentioned tubular wall 38 depends, and an upwardly extending peripheral wall 72.

The filter well 68 receives a commercially available replaceable filter unit 74. The filter unit 74 includes a rigid, water impermeable, housing 76 comprising a flat rectangular base 78 and an upwardly extending peripheral wall 80 integral with the base. Filter material 81 occupies the interior of the filter housing 76 which is open on its upper surface so that raw water may enter the filter material and pass therethrough. At the center of the base 76, there is provided a downwardly projecting boss 82. The lower end of the boss 82 terminates a sufficient extent above the upper end of the actuating member 60 to avoid interference there with even when the latter occupies its extreme upper position. The boss 82 has an integral concentric passage 84 through which water once it has passed through the filter material may pass downwardly out of the filter unit 74.

The filter unit 74 is connected with the outer unit 36 by push fit connection between the boss 82 and an internal sleeve 90 fixedly and sealingly connected to the interior of the wall 38 of the outlet unit.

To ensure that raw liquid may not seep between the exterior of the filter 74 and the base wall 14 of the reservoir into the outlet passage 40 to pollute the filtered water, an annular, resilient, deformable, sealing member 92 extends about the boss 82 between the boss and the sleeve 90. As the boss 82 of the filter unit is pressed into the sleeve 90, the sealing member 92 is deformed into sealing engagement between the boss 82 and the sleeve 90 to prevent seepage of raw water from the reservoir 12 into the outlet passage 40.

To receive filtered liquid leaving the outlet units 36 the previously mentioned receptacles 20 are provided.

Each of the receptacles 20 include an inlet unit, generally designated 98, permanently connected with and carried by the receptacle 20 so that the flow of filtered water into the receptacles 20 may be automatically controlled, as will be described. As the two inlet units are identical, only one need be described. The inlet unit 98 includes a recessed well 100 (FIG. 3) formed integrally in the upper wall 26 of the receptacle. The well 100 is of generally annular form defined by a horizontal circular base wall 102 bounded at its outer edge by an upwardly inclined outer wall 104 and at its inner edge by an upwardly directed circular boss 106. The annular well 100 is concentric with the axis x–x of the associated outlet unit 36 when the receptacle is mounted in the housing and is of sufficiently large radial extent to catch all the water pouring down from the outlet unit. Water passing into the well 100 flows through a plurality of openings 110 extending through the wall 102, into the interior of the water receptacle to fill it. The well 100 and the openings 110 together constitute an inlet passage through which water may be admitted to the interior of the receptacle to fill it. Also, upon pouring of water from the receptacle by the spout 32, the inlet passage provides venting of the receptacle to facilitate pouring of the water.

The inlet unit 120 also includes a buoyant float 122. When the level of liquid in the receptacle starts to approach the top of the receptacle, the float 122 commences to float on the liquid and rises upwardly as the level of liquid approaches the top of the container. Thus the float 122 functions as a sensor responsive to the level of liquid within the receptacle.

The float body 122 includes a hollow cylindrical lower body 124 concentric with the axis x–x and an upper body or control member 126 also of cylindrical form concentric with the axis x–x extending upwardly from the lower body 124. The control member 126 having an upwardly convex, curved top surface 128. The upper and lower bodies 124 and 126 are hollow and in fluid communication with each other to define a closed interior chamber 129 within the float body to render it buoyant.

To guide the float body for vertical motion along the axis x–x, the exterior of the control member 126 is slidably received within a concentric bore 129 provided in the previously mentioned boss 106 on the top wall 26 of the container.

Downward motion of the float body 122 within the receptacle 20 is limited to a predetermined amount by a float enclosure body 131 forming a part of the inlet unit 120. The float enclosure body comprises a generally tubular housing fixedly connected to the under side of the base wall 102 of the receptacle extending down about and loosely enclosing the float body 122. At its lower end, the float enclosure body includes a radially inwardly extending, peripheral lip 132 which underlies and abuttingly supports the base of the float body in a predetermined lowest position thereof within the receptacle 20. The positioning of the lip 132 in respect to the dimensions of the float body 122 is such as to ensure that even in its lowest position, the upper surface 128 of the control member 126 on the float body extends upwardly of the upper wall 26 of the receptacle.

When the receptacle 20, in an empty condition, is moved into its housed position within the housing, the curved surface 128 on the float body slides into abutting contact with the oppositely curved surface 62 on the bottom of the actuator 60 thus creating an operative association between the actuator member and the float. As the receptacle 20 moves to its fully housed position, the surface 128 continues to move beneath the surface 62 until in the fully housed condition, the lowest point of the surface 62 is in contact with the highest point on the surface 128.

At this time the dimensions of the members are such that the valve member 56 is positioned axially centrally of the valve chamber 50 in the outlet unit 36 (as shown in FIG. 2). Water is thus free to flow from the reservoir 12 through the filter 74 into the outlet passage 40. From there the filtered water passes through the upper bore portion 46 via the upper grooves 64 in the actuator member 60, then through the chamber 50 around the edges of the valve member 56 and finally out from the chamber 50 through the lower bore portion 48 via the lower grooves 66 in the actuator member. The water leaving the outlet unit flows into the well 100 of the receptacle inlet unit and through the passages 110 into the interior of the receptacle 20 to fill the receptacle.

As the receptacle fills up, the water in the receptacle eventually starts to reach a level close to the top of the receptacle. At this time the water contacts the buoyant float 122 which thereafter moves upwardly, floating on the level of the water in the receptacle. As the float 122 moves upwardly it remains in contact with the actuator member 60 which is correspondingly moved upwardly until the actuator member 60 is moved to its extreme upper position (FIG. 4). At this time the valve member 56 seats against the upper seat 52, as previously described, to terminate further flow of liquid through the outlet unit 36. The dimension of the float in relation to the level of the water and the container dimension are so arranged that at the time the float 122 reaches the upper position, the level of water within the receptacle 20 is below the spout 32 to avoid overflowing of water from the spout.

It will be appreciated that the arrangement described offers very significant advantages in that it provides for automatic commencement of a flow of filtered water into an emptied or partially emptied receptacle whenever the receptacle is placed in the housing.

Additionally, and equally significantly, filling of water into the receptacle is terminated automatically after the receptacle has been filled to a predetermined level which is less than that at which the receptacle would overflow. Thereafter overflowing of water, either from the spout of the receptacle or by continued pouring of water from the outlet unit of the housing over the exterior of the receptacle, is prevented. This avoids unwanted wetting of the exterior of the receptacle to the inconvenience of persons using it and in addition avoids messy and otherwise deleterious leakage of water from the filtering unit.

At some time it may be decided to remove the receptacle 20 from the housing for use of the water within the receptacle. At this time as the receptacle 20 commences to be slid of the housing 2, the upper surface 128 of the float body progressively moves out of contact with the lower surface 62 of the actuator 60. The actuator member 60 is thereupon caused to move down by the effect of gravity and also by hydrostatic pressure acting on the upper surface of the valve member 56. As the float moves completely out of contact with the actuator member, the latter attains its extreme lower position in which it seats upon the lower seat 54 to close off flow of liquids from the outlet unit 36 (FIG. 3). The actuator member then remains in its lower position under the influence of gravity and hydrostatic pressure, to continue to hold off flow through the outlet unit until the next time the receptacle 20 is replaced.

During the short interval of motion of the actuator between its upper and lower positions upon removal of the receptacle 20, there may be a momentary flow of a few drops of water while the valve member 56 is passing between the upper and lower seats. However, this small flow falls into the previously mentioned well 100 and is conducted to the interior of the receptacle, so that no dripping or overflowing of unwanted water from the reservoir occurs.

An alternative embodiment of the outlet unit is shown in FIG. 5. In this embodiment a depending tubular wall 38a integral with the wall 14 is internally threaded to receive an externally threaded potion of a replaceable valve unit 42a. The valve unit 42a resembles the previously described valve unit 42 in that it includes an annular valve chamber 50 having a conical lower valve seat 54, and a valve member 56 connected with an actuator 60. However, in place of the upper conical valve seat, there is provided a horizontal diaphragm 150 extending transversely of the flow passage through the valve unit. The diaphragm includes a central opening 152 for flow of liquid through the diaphragm. When the actuating member 60 is moved to its upper position by the float in the manner previously described, a hemispherical, domelike projection 154 seats upon the edge of the opening 152 in the diaphragm 150 to terminate flow through the valve unit. The hydrostatic pressure acting on the upper side of the diaphragm 150 (which has at least limited flexibility) urges the diaphragm against the projection 154 to provide an assisted sealing action.

Although the invention has thus far been described with reference to a particular form of operative association between the sensor (the float 122) responsive to the liquid level in the receptacle and the flow controlling device (the valve 42 and actuator 60) involving direct mechanical contact, it will be appreciated that other forms of operative association may be provided. For example, the necessary operative association could be achieved without any direct mechanical connection by the use of a float body having magnetic portions of different permeability moving past a flux responsive electric control circuit in the housing connected with a different type of valve. Many other modifications may equally obviously be made. In addition, the particular form of valve utilized could be changed to include differently configured axially acting valves or to rotary and other valves.

Furthermore, it will be realized that the automatic flow cutoff and flow initiation system described could be utilized in systems other than filtration systems if this should be desired. For example, it would be possible to envision a soft drink dispensing system including a reservoir of mixed soft drinks from which pitchers may be filled with a minimum of attention for delivery to tables.

These and other suggested modifications are not, however, intended to be exhausted of the many applications for which the herein disclosed invention may be suitable.

SUMMARY OF ADVANTAGES

It will be appreciated that in constructing a liquid dispensing unit according to the present invention, certain significant advantages are provided.

In particular, the operative association afforded between the sensor responsive to the level of the liquid in the receptacle and the flow controlling unit on the housing ensures that flow of liquid into the receptacle is automatically commenced whenever the receptacle is moved into its housing position in the container.

Additionally, and equally significantly, such filling of liquid into the receptacle is automatically terminated without supervision by an operator whenever a predetermined maximum liquid level in the receptacle is attained or exceeded. This ensures that overflowing of the liquid from the receptacle due to continued pouring of liquid is avoided automatically.

Moreover, the biasing action afforded to the valve by gravitational and hydrostatic forces ensures that when the receptacle is removed from the housing, flow from the reservoir is automatically terminated without requiring manual control.

Also, by providing two receptacles, it is arranged that each receptacle may continue to fill up with filtered water even though the other receptacle has been removed from the unit for use.

Although suitable for many applications, a dispensing unit of this type is particularly suitable for water filtering applications wherein the equipment is likely to be in substantially constant use over long periods of time and where a requirement for constant supervision would be a great burden on the user. By the use of the structure described it is only necessary to fill the reservoir with raw water at periodic intervals and to replace the receptacles in the housing whenever they need filling.

Although the invention has been described with reference to one preferred embodiment, it will be appreciated by those skilled in the art that numerous additions, deletions, modifications, substitutions and other changes not specifically disclosed or described may be made which will fall within the purview of the appended claims.

I claim:

1. A liquid dispensing unit comprising:
  a housing including
    a reservoir adapted to be filled with liquid;
  a receptacle releasably connected with said housing, said receptacle adapted to contain liquid and having an inlet unit and a separate outlet opening or spout in an upper portion, said receptacle laterally removable from said housing, said inlet unit carried by and permanently connected with said receptacle, said inlet unit including,
    inlet passage means for conducting liquid into said said receptacle,
  sensor means connected with said receptacle for sensing the level of the liquid therein,
  an outlet unit connected with said housing, said outlet unit including,
    outlet passage means for conducting liquid from said reservoir to said inlet passage means whenever said receptacle is connected with said housing; and
    flow control means connected with said outlet passage means, said flow control means entering into operative association with said sensor means upon connection of said receptacle with said housing to cause liquid flow through said passage means whenever the liquid level in said receptacle is less than a predetermined value and to terminate the liquid flow through said passage means when said predetermined liquid level is exceeded, said flow control means being disassociated from said sensor means by disconnection of said receptacle from said housing, said flow means upon disassociation from said sensor means causing liquid flow through said outlet passage means to be terminated.

2. A liquid dispensing unit as defined in claim 1 further including;
  filter means connected with said housing interposed between said reservoir and said outlet passage means for filtering liquid passing from said reservoir outwardly through said outlet passage means.

3. A liquid dispensing unit as defined in claim 1 wherein, said reservoir is positioned generally vertically above said receptacle during connection thereof, and wherein said sensor means includes;
  float means adapted to float upon the surface of the liquid in said receptacle,
  and wherein said flow control means includes,
    valve means connected with outlet passage means for controlling flow of liquid therethrough, and float responsive means connected with said valve means, said float responsive means becoming operatively associated with said float means during connection of said receptacle with said housing to cause said valve means to permit flow through said outlet passage means when the liquid level in said receptacle is less than a predetermined value and to terminate the liquid flow when said predetermined liquid level is exceeded, said float responsive means being disassociated from said float means by disconnection of said receptacle from said housing, said float responsive means upon said disassociation causing said valve means to terminate liquid flow through said outlet passage means.

4. A liquid dispensing unit as defined in claim 3 wherein, said float responsive means further includes;
   an actuating member operatively connected with said valve means, said actuating member being movably connected with said housing for motion between vertically spaced, upper and lower, extreme positions, said actuating member being downwardly biased toward said lower extreme position, said actuating member in any position intermediate said extreme positions causing said valve means to permit fluid flow, said actuating member in each of said extreme positions causing said valve means to terminate liquid flow,
and wherein said float means further includes,
   a buoyant float body adapted to float upon the surface of liquid in the container,
   a control member connected with said float body extending upwardly therefrom into releasable engagement with a portion of said actuating member upon lateral connection of said receptacle with said housing, said control member causing said actuating member to occupy said upper extreme position when said float body is at said predetermined level; and
   limiting means connected with said receptacle for limiting extreme downward movement of said float body within said receptacle to a position in which said control member supports said member above said lower extreme position thereof.

5. A liquid dispensing unit as defined in claim 4 wherein, said limiting means further includes;
   a float body enclosure fixedly connected with the interior of said receptacle, said enclosure loosely enclosing said float body extending generally vertically said enclosure initially being in fluid communication with the liquid in said receptacle; and
   a generally horizontal abutment portion projecting inwardly of said float body housing beneath said float body, said float body resting upon said abutment portion whenever the level of liquid in said receptacle falls below said abutment portion.

6. A liquid dispensing unit as defined in claim 4 wherein, said valve means further includes;
   upper and lower valve seats spaced vertically within said outlet passage means,
   a valve body movable vertically within said outer passage means between said upper and lower valve seats, said valve body in position intermediate said valve seats permitting fluid to flow through said outlet passage means but preventing fluid flow therethrough when said valve body is in abutting contact with each of said upper and lower valve seats; and
wherein said movable member includes;
   a vertical elongate member fixedly connected with said valve body, said member slidably received within the outlet passage means to guide said valve body between said upper and lower positions and having a free lower extremity resting abuttingly upon an upper extremity of said control member.

7. A liquid dispensing unit as defined in claim 6 wherein said member and said control member at their points of abutting contact are provided with oppositely curved, generally arcuate surfaces to facilitate entry into abutting contact of said members.

8. A liquid dispensing unit as defined in claim 6 wherein,
   said upper valve seat includes a horizontal diaphragm of at least limited flexibility extending extending transversely of said outlet passage, said upper valve seat having an opening therethrough,
   said valve body having an upper end contacting the underside of said diaphragm to close said opening upon movement of said valve body to the upper position thereof.